(12) United States Patent
Kesiboyana et al.

(10) Patent No.: US 11,704,121 B2
(45) Date of Patent: *Jul. 18, 2023

(54) METHODS AND SYSTEMS FOR MONITORING CONTRIBUTOR PERFORMANCE FOR SOURCE CODE PROGRAMMING PROJECTS

(71) Applicant: Capital One Services, LLC, McLean, VA (US)

(72) Inventors: Satish Kesiboyana, McLean, VA (US); Pedro Betancourt, McLean, VA (US); Gerardo Fang, McLean, VA (US); Shiv Somashekhar, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,605

(22) Filed: Sep. 28, 2021

(65) Prior Publication Data

US 2022/0050677 A1 Feb. 17, 2022

Related U.S. Application Data

(63) Continuation of application No. 16/902,133, filed on Jun. 15, 2020, now Pat. No. 11,150,898.

(51) Int. Cl.
| | | |
|---|---|---|
| G06F 8/77 | (2018.01) | |
| G06F 8/71 | (2018.01) | |
| G06F 8/34 | (2018.01) | |
| G06N 20/00 | (2019.01) | |
| G06F 11/34 | (2006.01) | |

(52) U.S. Cl.
CPC .............. *G06F 8/77* (2013.01); *G06F 8/34* (2013.01); *G06F 8/71* (2013.01); *G06F 11/3438* (2013.01); *G06N 20/00* (2019.01)

(58) Field of Classification Search
CPC ..... G06F 8/77; G06F 8/34; G06F 8/71; G06F 11/3438; G06N 20/00
USPC ..................................................... 717/101
See application file for complete search history.

(56) References Cited

U.S. PATENT DOCUMENTS 11,150,898 B1 * 10/2021 Kesiboyana ......... G06Q 10/103

* cited by examiner

*Primary Examiner* — John Q Chavis
(74) *Attorney, Agent, or Firm* — Perkins Coie LLP

(57) ABSTRACT

Methods and systems for monitoring contributor performance for source code programming projects in order to increase the velocity of workflow and the efficiency of project teams. In particular, the methods and systems record the particular type of issue that is tagged for a given contribution, if any, and monitor the amount of programming time of the contributor that is required to resolve the issue. The programming time required to resolve the issue, the type of issue, and/or other characteristics of contributors are then used to generate real-time recommendations related to the performance of the contributor relative to the project team.

20 Claims, 12 Drawing Sheets

METHODS AND SYSTEMS FOR MONITORING CONTRIBUTOR PERFORMANCE FOR SOURCE CODE PROGRAMMING PROJECTS

CROSS-REFERENCE TO RELATED APPLICATIONS

This application is a continuation of U.S. patent application Ser. No. 16/902,133, filed Jun. 15, 2020. The content of the foregoing application is incorporated herein in its entirety by reference.

FIELD OF THE INVENTION

The invention relates to monitoring contributor performance for source code programming projects.

BACKGROUND

Computer programming is typically a team-based activity, in which the responsibilities for the features and source code necessary to produce a given project (e.g., a software application) are shared among team members. To facilitate this team activity, team members may submit contributions to the project to a distributed version control system. This system may include a codebase that features a full history of the project that is mirrored on every contributor's computer. The system may enable automatic management of different branches of the project as well as the merging of different contributions. The team may also utilize one or more issue management and bug-tracking tools. The team may further out-source some issues to software-as-a-service providers. Accordingly, project management for computer programming often involves multiple team members and service providers sharing multiple versions, a single codebase for the project. As the single codebase is shared amongst team members, the performance of each team member must be monitored and assessed in order to maintain workflow velocity and prevent bottlenecks.

Furthermore, while responsibilities of each team member are often intertwined, the tasks of individual team members are distinct. The distinctness of each task makes determining the quality of the contribution of each team member difficult. Even once a source code contribution has been generated, the review of that code is both a time-consuming and subjective process. Thus, determining the quality of an individual team member is often difficult. However, many tasks must be performed in series and must build on top of previously completed tasks. Contributions of poor quality, or poorly performing contributors, may therefore create bottlenecks that may stall a project. Accordingly, the inability to properly determine the performance of a contributor results in a decrease in the velocity of workflow in the project and reduces efficiency of the project team overall.

To create further complications, as each team member may generate multiple contributions each corresponding to a different task, and even tasks requiring different skills. The criteria for each of these tasks may vary as well as the performance of the team member during each task. A team member's overall performance must therefore be based on multiple tasks, perhaps across multiple projects and time periods, each requiring distinct skills, with no baseline metric to measure performance on an individual or aggregate level.

SUMMARY

Methods and systems are described herein for monitoring contributor performance for source code programming projects in order to increase the velocity of workflow and the efficiency of project teams. As described above, determining the quality of an individual contributor as well as the quality of the contributor's work is often difficult. The methods and systems described herein solve this problem by storing additional information on specific metrics related to a contribution to a source code programming project. These metrics create quantitative assessments for the contributor and the contributor's contribution. These metrics in turn can be used to generate unbiased and non-subjective recommendations related to the contributor's performance. Additionally, the metrics are flexible and not tied to a particular task or skill and may be scaled to reflect the contributor's performance across multiple projects and/or time periods.

For example, due to the nature of coding, different tasks may take different amounts of time, and the dynamic nature of coding and software development projects prevents a standardization of the time required or the way in which to complete tasks (e.g., what code to use), even with tasks that have similar criteria. Moreover, the stylistic differences between coders may cause different coders to subjectively view a contribution more or less positively based on whether or not the style reflects his/her own stylistic choices, even if the underlying contribution is functionally the same or better. Thus, conventional systems that focus on assessing the quality of the contribution, based on the code itself, provide a biased and subjective analysis. Moreover, many software development control systems rely on software development tools through which contributions may be submitted that are not strictly based on the code itself; thus, conventional systems are not able to assess these contributions.

In contrast, the methods and systems described herein assess the quality of a contribution and/or contributor based on specifically selected standardized metrics that are determined through novel means. By using these metrics, contributors and project teams as a whole may receive real-time feedback on contributor performance, from a variety of software development tools that is unbiased and non-subjective. In particular, the methods and systems as described herein record the particular type of issue that is tagged for a given contribution, if any, and monitor the amount of programming time of the contributor that is required to resolve the issue. The programming time required to resolve the issue, the type of issue, and/or other characteristics of contributors are then used to generate real-time recommendations related to the performance of the contributor relative to the project team. The use of these specific non-conventional data points provide a standardized way to assess the quality of the contribution, which is bias free. Additionally, the use of these specific non-conventional data points allows for the system to normalize and interpret metrics that may be received from a plurality of different software development tools.

Methods and systems are also described herein for generating qualitative graphical representations of the standardized metrics. For example, in order to allow contributors to intuitively understand and compare the standardized metrics, the methods and systems convert the standardized metrics into graphical representations that allow for a qualitative comparison of contributors. This conversion includes the retrieval of the standardized metrics and the use of non-conventional techniques for filtering the metrics based on dynamic criteria to generate software development scores that may be used to compare different contributors.

Moreover, in order to generate the graphical representations in a comparative manner, in which different contributors may have different authorizations to access and/or review information about different contributors, the methods and systems recite the non-conventional technique of filtering the data used to generate the graphical representations prior to generating the graphical representations as opposed to after. By doing so, the methods and systems, provide a graphical representation of a qualitative comparison of different contributors without creating additional privacy concerns.

In one aspect, the system may receive a first contribution of source code for a first project to a software development version control system, wherein the first contribution is received from a first contributor. The system may tag the first contribution with a first identified issue. The system may assign the first identified issue to a second contributor. The system may receive a second contribution of source code to resolve the first identified issue. The system may determine a first resolution type of the second contribution. The system may determine a first length of programming time corresponding to the second contribution. The system may generate a first resolution metric for the second contribution based on the first resolution type and the first length of programming time. The system may assign the first resolution metric to the first contributor. The system may then generate for display a first performance recommendation for the first contributor, wherein the first performance recommendation is based on comparing the first resolution metric to a first plurality of resolution metrics assigned to other contributors of the first project.

In one aspect, the system may monitor contributions to software development version control systems for source code programming projects. For example, the system may receive a first software development score for a first contributor to a software development version control system, wherein the first software development score is based on a first plurality of weighted metrics. The system may store the first software development score with a plurality of other software development scores for other contributors. The system may receive a first user input from the first contributor requesting access to the database. The system may retrieve a user profile for the first contributor in response to receiving the first user input, wherein the user profile includes a first authorization. The system may determine a subset of the plurality of other software development scores to which the first contributor has access based on the first authorization. The system may generate for display, on a local device, a graphical representation of a qualitative comparison of the first software development score and the subset of the plurality of other software development scores.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

Figure 1:
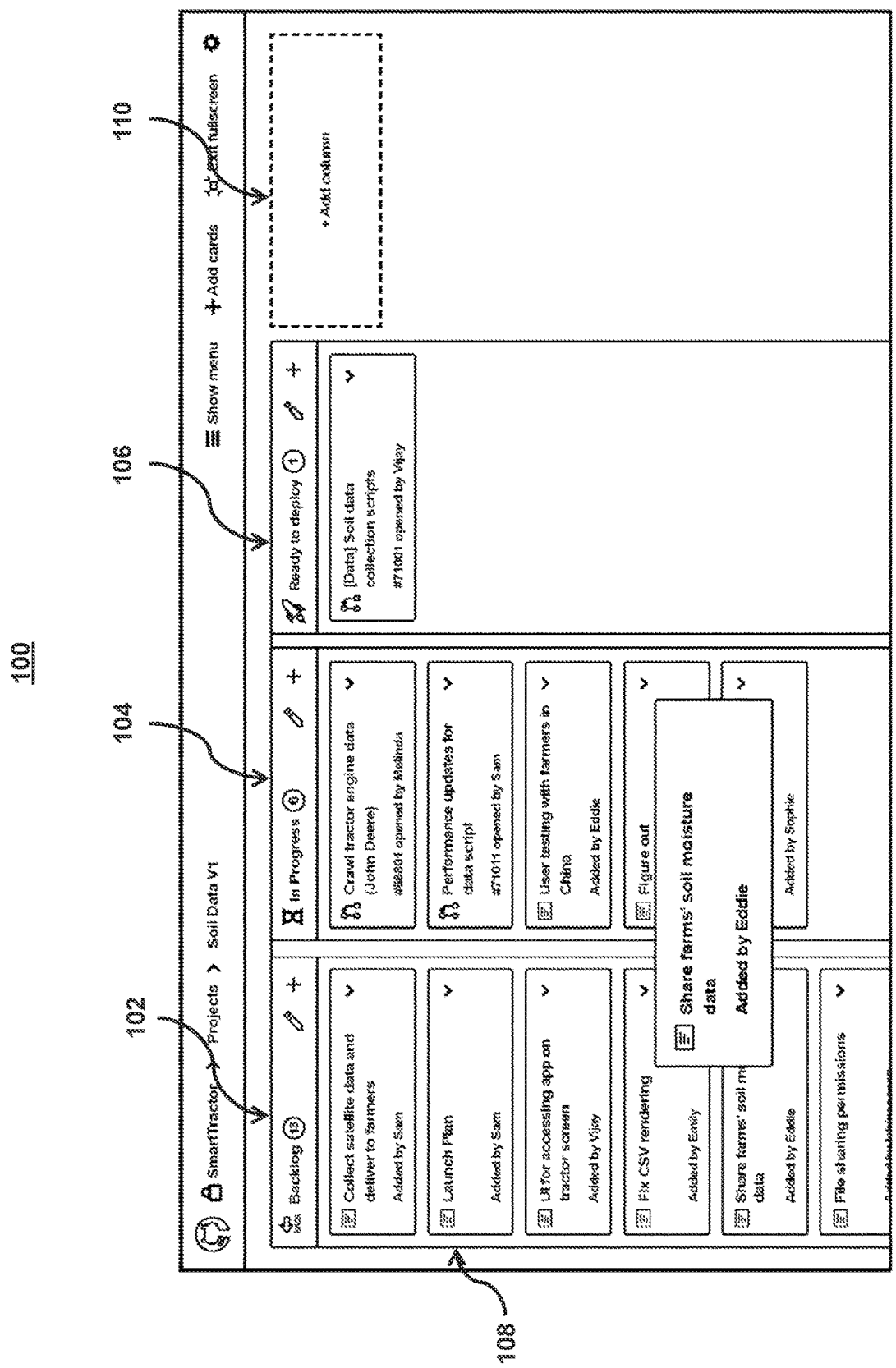
FIG. 1 shows an illustrative user interface for a software development version control system, in accordance with one or more embodiments.

FIG. 1 shows an illustrative user interface for a software development version control system, in accordance with one or more embodiments. For example, the system and methods described herein may generate for display, on a local display device (e.g., user device 222 and 224 (FIG. 2) described below), a first performance recommendation for a first contributor. The first performance recommendation may be based on comparing a first resolution metric to a first plurality of resolution metrics assigned to other contributors of a first project.

As described herein, a performance recommendation may include any quantitative or qualitative recommendation based on the performance of the contributor. The recommendation may be directed to the contributor themselves and/or may be director to a project manager or other contributors. In some embodiments, the system may further tailor the recommendation based on the determined audience of the recommendation. The performance recommendation may include one or more types of information. For example, the performance recommendation may include an individual (e.g., compare the contributor's current performance to a historical performance) or comparative analysis (e.g., compare the contributor to other contributors) of the contributors. The performance recommendation may be based on a performance level of the contributor (e.g., either historic or current) and/or the performance level of other contributors (e.g., either historic or current). The performance level may include any quantitative or qualitative description of the contributor's performance.

The performance level may itself be based on one or more resolution metrics. While resolution metrics may include any quantitative or qualitative description of a given contributor's performance with regards to a specific contribution, the resolution metric may be based on multiple factors (e.g., as described below in relation to FIG. 4). In some embodiments, the system may determine resolution metrics based on specific data that is generated in addition to a contributor's normal contribution. This data may represent a quantitative assessment of the performance of the contributor. Furthermore, to limit bias and subjective input, the data may be normalized not to a specific task (e.g., how others performed on the specific task), but based on an assessment of the type and time to program a resolution to issues detected in the contributor's performance.

For example, FIG. 1 displays user interface 100. User interface 100 may represent an exemplary user interface for software development version control system. As such, user interface 100 may include a plurality of tasks (e.g., task 104) that need to be completed for a project. As described herein, a project may include any individual or collaborative enterprise that is carefully planned and designed to achieve a particular aim. In some embodiments, the project may include a source code programming or other project related to the development of software or a computer-based feature. The project may also include multiple components or more of which may be based on programming source code, non-source code programming, and/or other development goals. Each project may include one or more contributors that submit contributions to the goal of the project. For example, the project may include the development of a computer feature and/or the contributors to the project may be linked together through a common entity (e.g., a company) or organized in a distributed fashion (e.g., a crowd-sourced project). The project may be distinguished from other projects based on a stated goal, time period, and/or the constituency of contributors.

In some embodiments, one or more contributions may correspond to one or more projects and/or may further correspond to one or more software development tools. For example, the software development version control system may receive contributions from one or more software development tools. Each software development tool may provide one or more good or service that furthers a goal of the software development tool. For example, a software development tool may include a software-as-a-service provider, that provides technical management support, such as IT service management, to the IT operations of large corporations, including providing help desk functionality. In another example, the software development tool may include a site that provide social networking-like functions such as feeds, followers, wikis and a social network graph to display how developers work on their versions ("forks") of a repository and what fork (and branch within that fork) is newest. In another example, the software development tool may include a service for hosting code snippets for small and/or large projects. In another example, the software development tool may include a service used for issue tracking and project management.

As presented in FIG. 1, the plurality of tasks may be filtered based on a user selection requesting the display of completed tasks with identified issues (e.g., identified through manual peer review, in accordance with project procedures, and/or automatically through an issue-spotting or bug-tracking program). For example, a user (e.g., a project manager and/or contributor) may filter the tasks by selecting an icon associated with tasks having issues (e.g., icon 102).

User interface may further include an icon featuring information about a given issue (e.g., icons 106 and 108). For example, icons 106 and 108 may indicate the type of issue, how the issue was detected (e.g., based on manual or automatic review), and/or whether or not the issue is confirmed to exist. User interface 100 may also include an icon indicating a second contributor that is assigned to resolve the issue (e.g., icon 110). As described below in relation to FIG. 5, in some embodiments, the system may assign a second contributor to resolve the issue based on the respective performance levels of the contributors.

User interface 100 and the information displayed therein may be generated using cloud-based memory configured to store current source code for a first project and tags for identified issues in the current source code. For example, by storing current source code (e.g., a codebase) for the project and receiving contributions from multiple contributors, the system may manage the creation of the source code for the project while detecting and resolving issues in individual contributions. Furthermore, by generating tags (e.g., metadata describing issues and information related to the issue such as the contributor, type of task, how the issue was detected, etc.), the system may assign and resolve the identified issue through a means that allows for the creation of the resolution metric.

For example, the cloud-based control circuitry configured to receive a first contribution of source code for a first project to a software development version control system, wherein the first contribution is received from a first contributor and tag the first contribution with a first identified issue. The system may then assign the first identified issue to a second contributor and receive a second contribution of source code to resolve the first identified issue.

Additionally, the system may determine a first resolution type of the second contribution and determine a first length of programming time corresponding to the second contribution. The information which relates to the way in which the issue was resolve and the time that was required to resolve the issue is then used to generate a first resolution metric for the second contribution based on the first resolution type and the first length of programming time, wherein the first resolution metric is generated using a machine learning model that compares the first length of programming time to a determined average length of programming time for the first resolution type.

As used herein, a resolution type includes a quantitative or qualitative metric used to distinguish one resolution type from another resolution type. For example, resolution type may be distinguished based on the underlying problem such as erroneous code (e.g., unclosed loops, typographical errors, etc.), poor design (e.g., redundant functions, unnecessary links, etc.), or incorrect programming language and/or use of incorrect programming language functions. The resolution type may alternatively or additionally be based on the complexity of the resolution. For example, the correction of a typographical error may have low complexity, whereas the re-writing of an entire sequence of the contribution may have a high complexity. The resolution type may alternatively or additionally be based on the skills of the contributor required to resolve the issue. For example, the correction of a typographical error may require only proofreading skills, whereas the re-writing of an entire sequence of the contribution may require problem-solving and/or knowledge of the programming language.

The system may also track the amount of time required by the second contributor to correct the problem. In some embodiments, the system may track the entire length of time from assignment to resolution of the issue. Alternatively or additionally, the system may determine a length of programming time corresponding to a second contribution. For example, the length of programming time may correspond to the amount of time to generate new code. In some embodiments, the system distinguishes length of time to generate the new code from the length of time (if any) required by the second contributor to identify the issue. For example, by distinguishing the total time in this way, the system may prevent the resolution metric from being biased by stylistic choices and/or other factors. The system may likewise determine a time the second contributor actually spent to resolve the issue (e.g., based on determining that the second contributor was active at his/her user device) in order to prevent the system from considering time when the second contributor was away from his/her user device (e.g., on a break).

The system may then generate and assign the first resolution metric. In some embodiments, the system may track multiple contributors across multiple projects and/or time periods and with references to the current, determined and/or historical skills and performance level of numerous contributors. In some embodiments, the system may generate machine learning models to determine resolution metrics, performance levels, and/or performance recommendations.

In some embodiments, user interface 100 may also provide recommendations for staffing for future projects and/or tasks. For example, the system may monitor a software development score of a contributor (e.g., as described in FIGS. 11-12 below). As the contributor, contributes to more projects and/or tasks, the system may update the software development score of the contributor. For example, the system may receive an updated first software development score for the first contributor, store the updated first software development score, and generate for display a graphical representation of a relationship of the first software development score to the updated first software development score (e.g., as shown in FIGS. 6-10). The system may further extrapolate a future first software development score for the first contributor on a future project based on the first software development score and the updated first software development score and generate for display a recommendation for staffing the future project based on the future first software development score. For example, the system may recommend a given contributor for a given task and/or project in order to provide the most efficient and effective staffing.

Figure 2:
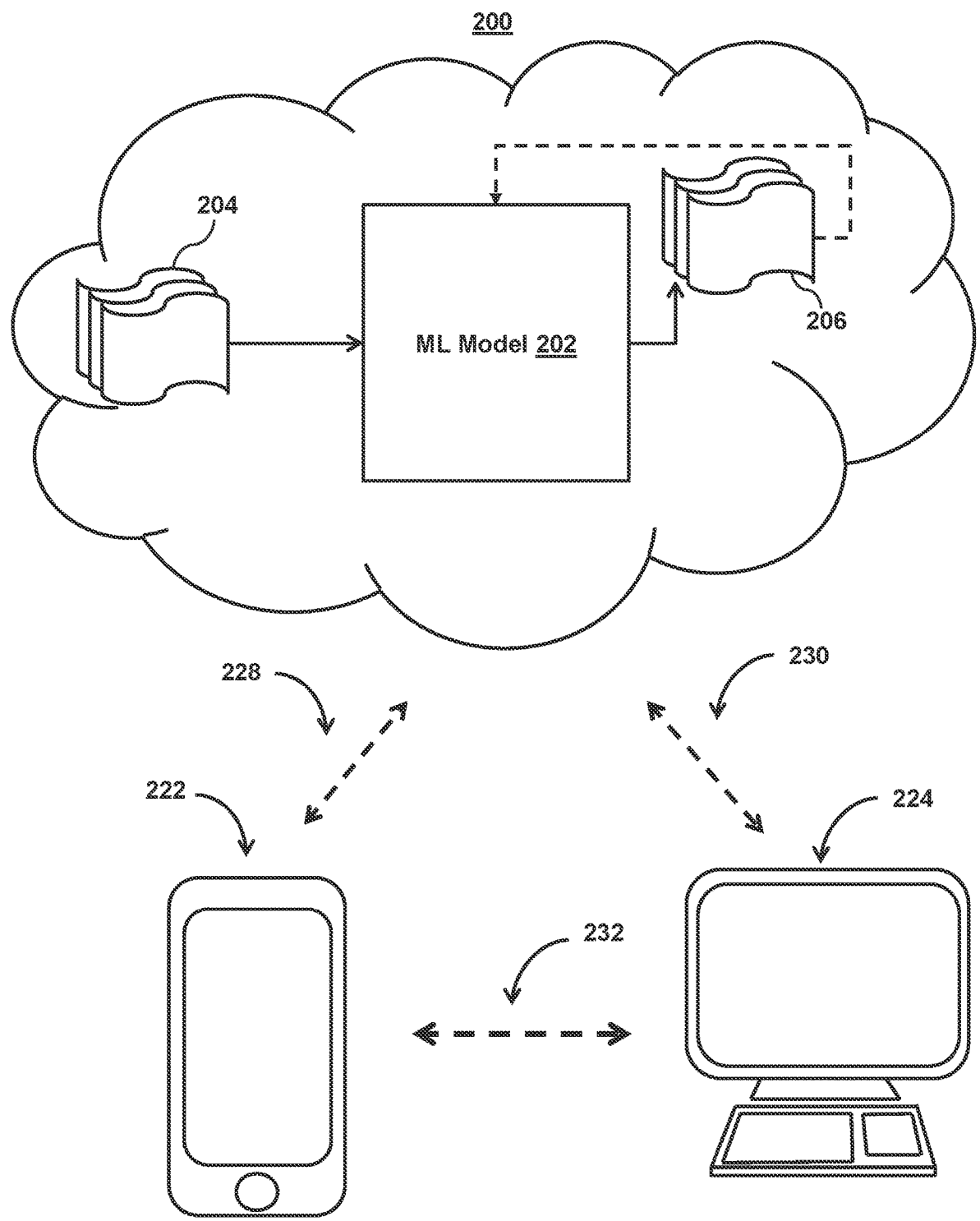
FIG. 2 shows an illustrative system for a software development version control system, in accordance with one or more embodiments.

FIG. 2 shows an illustrative system for a software development version control system, in accordance with one or more embodiments. As shown in FIG. 2, system 200 may include user device 222, user device 224, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 100 (FIG. 1)). By way of example, user device 222 and user device 224 may include a desktop computer, a server, or other client device. Users may, for instance, utilize one or more of the user devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of user device 222, those operations may, in some embodiments, be performed by components of user device 224. System 200 also includes machine learning model 202, which may be implemented on user device 222 and user device 224, or accessible by communication paths 228 and 230, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

For example, in some embodiments, system 200 may represent a cloud based system that includes multiple cloud-based components for providing a software development version control system for monitoring contributor performance for source code programming projects. The cloud-based system may include components such as memory, control circuitry, and/or I/O circuitry. The cloud-based memory may be configured to store source code contributions, from a plurality of software development tools, for a first project, a first software development score for a first contributor, wherein the first software development score is based on a first plurality of weighted metrics, and a plurality of other software development scores for other contributors. The cloud-based control circuitry may be configured to receive a first user input from the first contributor, retrieve a user profile for the first contributor in response to receiving the first user input, wherein the user profile includes a first authorization, and determine a subset of the plurality of other software development scores to which the first contributor has access based on the first authorization. The cloud-based I/O circuitry may be configured to generate for display, on a local display device, a graphical representation of a qualitative comparison of the first software development score and the subset of the plurality of other software development scores.

In some embodiments, the cloud-based memory may be configured to store current source code for a first project and tags for identified issues in the current source code. The cloud-based control circuitry may be configured to receive a first contribution of source code for a first project to a software development version control system, wherein the first contribution is received from a first contributor, tag the first contribution with a first identified issue, assign the first identified issue to a second contributor, receive a second contribution of source code to resolve the first identified issue, determine a first resolution type of the second contribution, and determine a first length of programming time corresponding to the second contribution, generate a first resolution metric for the second contribution based on the first resolution type and the first length of programming time, wherein the first resolution metric is generated using a machine learning model that compares the first length of programming time to a determined average length of programming time for the first resolution type, and assign the first resolution metric to the first contributor. The cloud-based I/O circuitry may be configured to generate for display, on a local display device, a first performance recommendation for the first contributor, wherein the first performance recommendation is based on comparing the first resolution metric to a first plurality of resolution metrics assigned to other contributors of the first project.

FIG. 2 also includes communication paths 228, 230, and 232. Communication paths 228, 230, and 232 may include the Internet, a mobile phone network, a mobile voice or data network (e.g., a 4G or LTE network), a cable network, a public switched telephone network, or other types of communications network or combinations of communications networks. Communication paths 228, 230, and 232 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 2, machine learning model 202 may take inputs 204 and provide outputs 206. The inputs may include multiple data sets such as a training data set and a test data set. Each of the plurality of data sets (e.g., inputs 204) may include data subsets with common characteristics. The common characteristics may include characteristics about a contributor, task and/or project for use in determining resolution metrics, performance levels, and/or performance recommendations. In some embodiments, outputs 206 may be fed back to machine learning model 202 as input to train machine learning model 202 (e.g., alone or in conjunction with user indications of the accuracy of outputs 206, labels associated with the inputs, or with other reference feedback information). In another embodiment, machine learning model 202 may update its configurations (e.g., weights, biases, or other parameters) based on the assessment of its prediction (e.g., outputs 206) and reference feedback information (e.g., user indication of accuracy, reference labels, or other information). In another embodiment, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, machine learning model 202 may include an artificial neural network. In such embodiments, machine learning model 202 may include input layer and one or more hidden layers. Each neural unit of machine learning model 202 may be connected with many other neural units of machine learning model 202. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 202 may be self-learning and trained, rather than explicitly programmed, and can perform significantly better in certain areas of problem solving, as compared to traditional computer programs. During training, an output layer of machine learning model 202 may corresponds to a classification of machine learning model 202 and an input known to correspond to that classification may be input into an input layer of machine learning model 202 during training. During testing, an input without a known classification may be input into the input layer, and a determined classification may be output.

In some embodiments, machine learning model 202 may include multiple layers (e.g., where a signal path traverses from front layers to back layers). In some embodiments, back propagation techniques may be utilized by machine learning model 202 where forward stimulation is used to reset weights on the "front" neural units. In some embodiments, stimulation and inhibition for machine learning model 202 may be more free flowing, with connections interacting in a more chaotic and complex fashion. During testing, an output layer of machine learning model 202 may indicate whether or not a given input corresponds to a classification of machine learning model 202 (e.g., determine a first length of programming time based on a determined average length of programming time for a given first resolution type).

As shown in FIG. 2, machine learning model 202 has generated performance metric 244, which is displayed on user device 224. Performance metric 244 may include an individual contributor's performance level (e.g., across multiple contributors and/or projects) or may indicate a latest performance metric. Additionally, performance metric 242 is displayed on user device 222. Performance metric 242 currently indicates the performance level of the entire project team. For example, performance metric 242 may indicate an aggregation on individual performance metrics (e.g., as generated by process 300 (FIG. 3) below).

Figure 3:
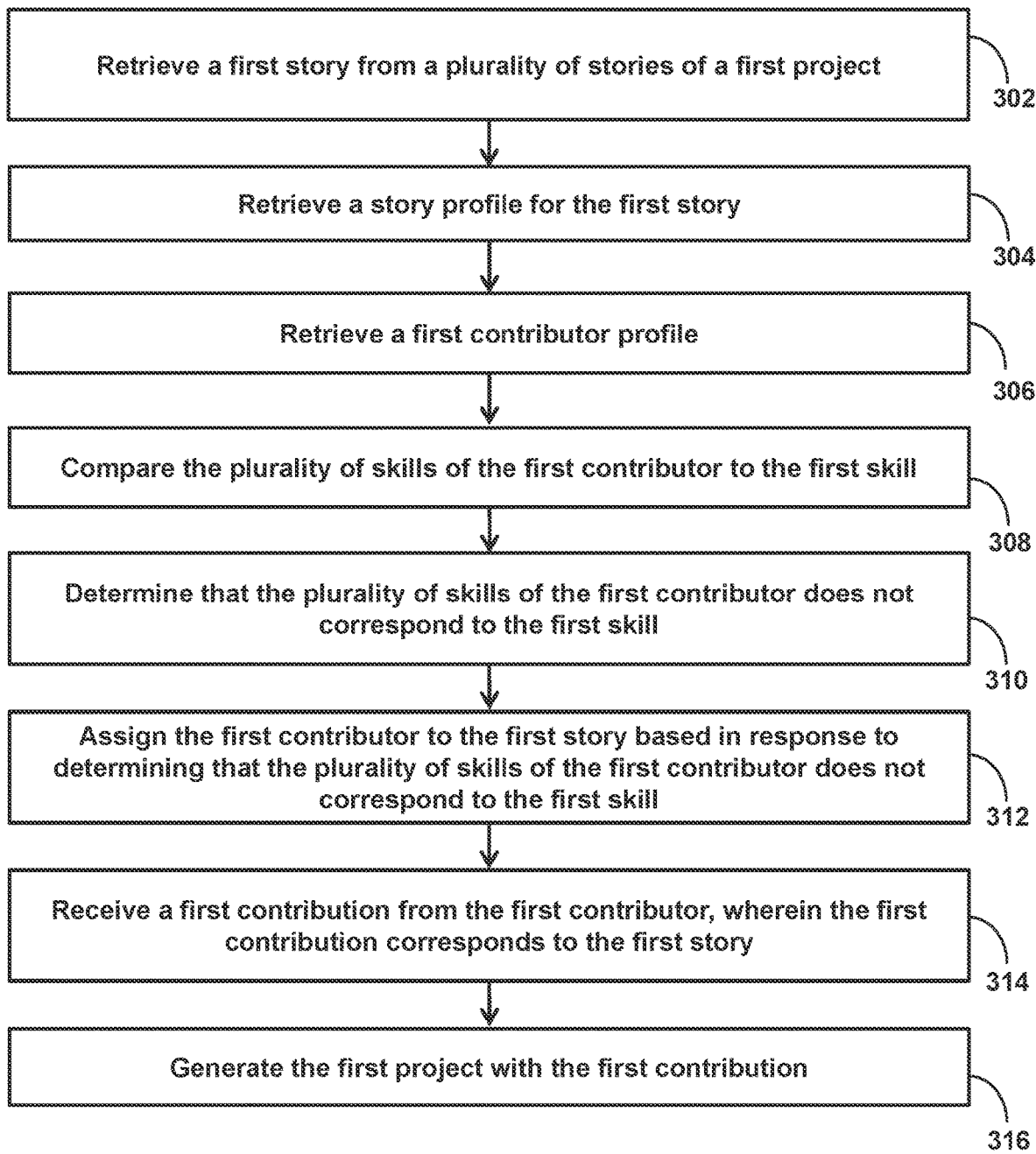
FIG. 3 shows a flowchart of the steps involved in generating for display a first performance recommendation for the first contributor, in accordance with one or more embodiments.

FIG. 3 shows a flowchart of the steps involved in generating for display a first performance recommendation for the first contributor, in accordance with one or more embodiments. For example, process 300 may represent the steps taken by one or more devices as shown in FIG. 1 when generating performance metric 244 (FIG. 2).

At step 302, process 300 receives (e.g., via a software development version control system) a first contribution of source code for a first project to a software development version control system. For example, the first contribution may be received from a first contributor as part of a first project. In some embodiments, the system may alternatively or additionally receive a contribution that third contribution is not a source code contribution. For example, the system may receive an additional contribution for the first project from the first contributor, wherein the third contribution is not a source code contribution, and wherein the first performance recommendation is further based on the third contribution.

At step 304, process 300 tags (e.g., via a software development version control system) the first contribution with a first identified issue. For example, the system may identify an issue automatically (e.g., based on bug-tracking or automatic issued detection) or manually based on a peer review. The tags may include information (e.g., metadata) describing the identified issue.

At step 306, process 300 assigns (e.g., via a software development version control system) the first identified issue to a second contributor. For example, the system may automatically assign the identified issue to another contributor for peer review (e.g., as described in FIG. 5 below). In some embodiments, the system may use a machine learning model (e.g., machine learning model 202 (FIG. 2)) to process various information about the contributors, project, and issue to identify a contributor for assignment.

At step 308, process 300 receives (e.g., via a software development version control system) a second contribution of source code to resolve the first identified issue. For example, the second contribution of source code may include one or more edits to the first contribution and/or additional contributions to the first contributions that resolve the issue. For example, the second contribution may include one or more actions and/or modifications to the first contribution. These modifications may include one or more different types of resolutions (e.g., fixing typographical errors, selecting a different algorithm, etc.). The system may track the different types of resolutions as well as the time required for each resolution.

At step 310, process 300 determines (e.g., via a software development version control system) a first resolution type of the second contribution. For example, the system may automatically detect the resolution type based on metadata associated with the first contribution. In some embodiments, the system may receive a classification of the resolution type from the second contributor (e.g., via user interface 100 (FIG. 1)).

At step 312, process 300 determines (e.g., via a software development version control system) a first length of programming time corresponding to the second contribution.

For example, the system may track (e.g., via a clock mechanism integrated into the software development version control system) the amount of programming time spent by the second contributor to resolve the issue. The system may use multiple means to determine the length of programming time corresponding to the second contribution (e.g., using manual or automatic clock and timekeeper mechanisms). Furthermore, as described in FIG. 1 above, in some embodiments, the system may divide the total time spent to generate the second contribution among the different resolution types (if any) as well as time not spent generating the second contribution.

At step 314, process 300 generates (e.g., via a software development version control system) a first resolution metric for the second contribution based on the first resolution type and the first length of programming time. For example, the system may generate a quantitative assessment of the amount of time and skill spent to resolve the issue. The system may use multiple factors to determine the resolution metric as described in FIG. 4 below.

At step 316, process 300 assigns (e.g., via a software development version control system) the first resolution metric to the first contributor. For example, the system may modify a contributor profile of the first contributor to include the first resolution metric. The contributor profile may include information about the current and historic performance of the contributor and/or one or more resolution metrics assigned to the first contributor.

At step 318, process 300 generates for display (e.g., via a software development version control system) a first performance recommendation for the first contributor. Accordingly, the system may use the programming time required to resolve the issue, the type of issue, and/or other characteristics of the contributor and the issue to generate real-time recommendations related to the performance of the contributor relative to the project team. The system may then display these recommendations in a user interface (e.g., user interface 100 (FIG. 1)) on a user device (e.g., user device 222 or 224 (FIG. 2)).

For example, the first performance recommendation may be based on comparing the first resolution metric to a first plurality of resolution metrics assigned to other contributors of the first project. For example, the system may determine a mean, median, mode, and/or other statistical difference or mathematical relationship of the first resolution metric of the first contributor to the average resolution metrics of the other contributors. The system may then output this metric (e.g., as a numerical expressed performance recommendation) or may further modify this metric into a qualitative assessment of the performance of the first contributor. The system may then include this qualitative assessment in a media object that is displayed on user devices (e.g., as shown in FIG. 2). Additionally or alternatively, the first performance recommendation may be based on determining a current performance level of the first contributor and determining an average performance level of the other contributors. The system may then compare the current performance level of the first contributor to the average performance level of the other contributors.

In some embodiments, the performance recommendation is further based on determining a first number of contributions of first contributor to the first project without an identified issue. For example, the system may average multiple resolution metrics associated with the first contributor. Additionally or alternatively, contributions with no identified issues may be used in this average.

In some embodiments, generating the first performance recommendation further comprises comparing the first resolution metric to a second plurality of resolution metrics assigned to other contributors of a second project. For example, the system may retrieve resolution metrics of similar contributions of other contributors in order to determine the resolution metric. Alternatively or additionally, in some embodiments the system may generate the first resolution metric using a machine learning model that compares the first length of programming time to a determined average length of programming time for the first resolution type (e.g., as described in FIG. 2 above).

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 and 6-10 could be used to perform one of more of the steps in FIG. 3.

Figure 4:
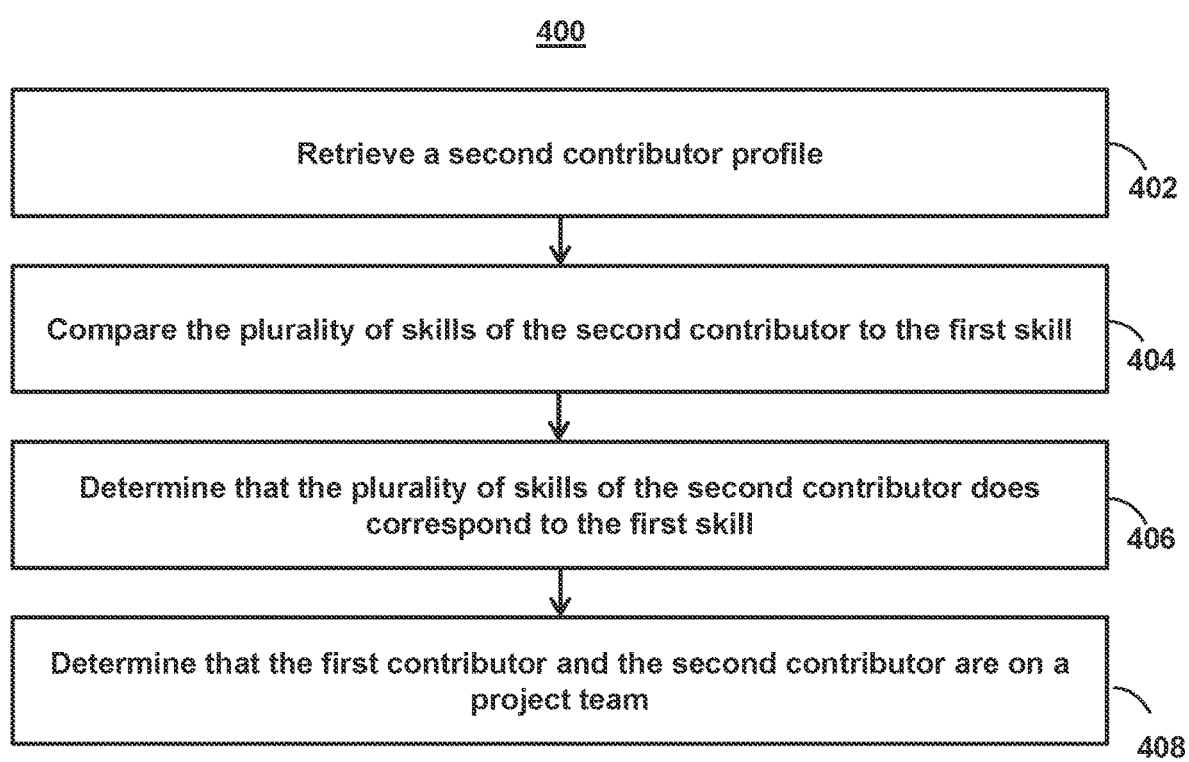
FIG. 4 shows a flowchart of the steps involved in determining a resolution metric, in accordance with one or more embodiments.

FIG. 4 shows a flowchart of the steps involved in determining a resolution metric, in accordance with one or more embodiments. For example, process 400 may represent the steps taken by one or more devices as shown in FIGS. 1-2 and 6-10 when determining a resolution metric.

At step 402, process 400 retrieves (e.g., via a software development version control system) a default resolution metric. For example, in some embodiments, the system may assign a default resolution metric to each resolution type. Upon determining a resolution type and/or time required to resolve any issues, the system may input these determinations into a lookup table databased that outputs a default resolution metric.

At step 404, process 400 determines (e.g., via a software development version control system) whether or not to modify the default resolution metric based on a difference between contributor levels. For example, the system may determine a first contributor level of the first contributor, determine a second contributor level of the second contributor, and determine a difference between the first contributor level and the second contributor level. The system may then modify the first resolution metric based on the difference. The first contributor level may reflect a skill level or level of experience of the user. Accordingly, if second contributor has a high skill level and thus the time to resolve the issue is low, the system can reflect this in the calculation of the resolution metric.

If the system determines not to modify the default resolution metric based on a difference between contributor levels, process 400 proceeds to step 410. For example, the system may determine that the difference is not available (or undeterminable) based on a lack of information about the contributors. Alternatively or additionally, the system may have received a predetermined list of criteria (e.g., from the project manager) indicating the criteria to use for a resolution metric. The system may determine that this criterion is not included. If the system determines to modify the default resolution metric based on a difference between contributor levels, process 400 proceeds to step 406. At step 406, process 400 determines (e.g., via a software development version control system) the difference between the contributor levels.

At step 408, process 400 modifies (e.g., via a software development version control system) the default resolution metric before proceeding to step 410. At step 410, process 400 determines (e.g., via a software development version control system) whether or not to modify the default resolution metric based on difference between the number of contributions. For example, the system may determine a number of contributions to the first project of the first contributor during a first time period, determine an average number of contributions by the other contributors to the first project, and determine a difference between the number of contributions and the average number of contributions. The system may then generate the first resolution metric based on the difference. Accordingly, if the first contributor has a high level of contribution (e.g., indicative of the first contributor working more than other contributors), the system can reflect this in the calculation of the resolution metric.

If the system determines not to modify the default resolution metric based on the difference between the number of contributions, process 400 proceeds to step 416. For example, the system may determine that the difference is not available (or undeterminable) based on a lack of information about the contributors. Alternatively or additionally, the system may have received a predetermined list of criteria (e.g., from the project manager) indicating the criteria to use for a resolution metric. The system may determine that this criterion is not included.

If the system determines to modify the default resolution metric based on the difference between the number of contributions, process 400 proceeds to step 412. At step 412, process 400 determines (e.g., via a software development version control system) the difference between the number of contributions. At step 414, process 400 modifies (e.g., via a software development version control system) the default resolution metric before proceeding to step 416.

At step 416, process 400 determines (e.g., via a software development version control system) whether or not to modify the default resolution metric based on a weight of the contribution. For example, in some embodiments, the system may modify the resolution metric based on a weight assigned to the contribution. The weight may be a quantitative or qualitative measure of the importance of a given contribution. For example, the weight may indicate that the contribution is particularly important, therefore any issues with the contribution are more heavily weighed against the contributor's resolution metric (and overall performance metric and/or level). Additionally or alternatively, a project manager may manually, or the system may automatically, weight the contribution based on additional factors (e.g., the assigned user is attempting this type of contribution for the first time, the contribution must be performed within a short turnaround time, etc.).

If the system determines not to modify the default resolution metric based on the weight of the contribution, process 400 proceeds to step 412. For example, the system may have received a predetermined list of criteria (e.g., from the project manager) indicating the criteria to use for a resolution metric. The system may determine that this criterion is not included. If the system determines to modify the default resolution metric based on the weight of the contribution, process 400 proceeds to step 418. At step 418, process 400 determines (e.g., via a software development version control system) the weight of the contribution.

At step 420, process 400 modifies (e.g., via a software development version control system) the default resolution metric before proceeding to step 422. For example, based on the modification the system may output a resolution metric for use in determining a performance level and/or performance recommendation of the first contributor.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 and 6-10 could be used to perform one of more of the steps in FIG. 4.

Figure 5:
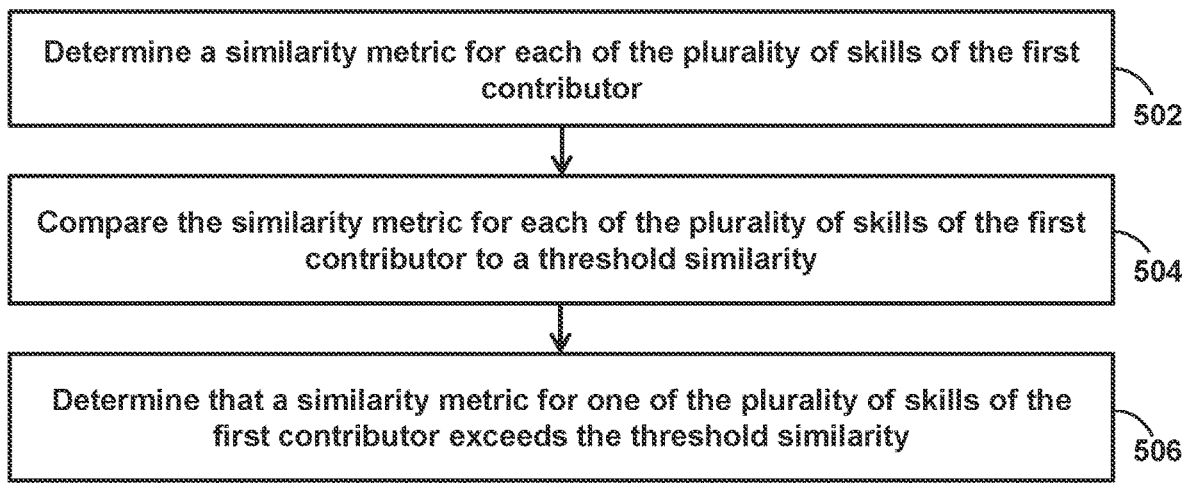
FIG. 5 shows flowchart of the steps involved in assigning issues to contributors based on current performance levels of the contributors, in accordance with one or more embodiments.

FIG. 5 shows flowchart of the steps involved in assigning issues to contributors based on current performance levels of the contributors, in accordance with one or more embodiments. For example, process 500 may represent the steps taken by one or more devices as shown in FIGS. 1-2 when assigning issues to contributors.

At step 502, process 500 determines (e.g., via a software development version control system) a current performance level of the first contributor. For example, the system may determine an individual performance level (e.g., performance metric 244 (FIG. 2) as described in FIG. 3 above. In some embodiments, the system may determine a performance level based on a specific resolution metrics. For example, the system may determine specific resolution metrics that are relevant to a specific resolution type. After determining a resolution type associated with an identified issue, the system may determine resolution metrics that are relevant to the resolution type. The system may then use the relevant resolution metrics to assign the issue to a contributor. Accordingly, the system may assign peer review of an issue to a contributor that is particularly skilled in the relevant issue.

At step 504, process 500 determines (e.g., via a software development version control system) an average performance level of the other contributors. For example, the system may determine an individual performance level (e.g., performance metric 244 (FIG. 2) as described in FIG. 3 above for all other contributors on the project team. The system may then average each of individual performance levels for the contributors.

At step 506, process 500 compares (e.g., via a software development version control system) the current performance level of the first contributor to the average performance level of the other contributors. For example, the system may determine a mean, median, mode, and/or other statistical difference or mathematical relationship of the current performance level of the first contributor to the average performance level of the other contributors.

At step 508, process 500 assigns (e.g., via a software development version control system) an identified issue to the second contributor in response to determining that the current performance level of the second contributor exceeds the current performance level of the first contributor. For example, the system may assign issues (e.g., for peer review) to a contributor after determining that that contributor has a higher performance level than the contributor that created the contribution.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 and 6-10 could be used to perform one or more of the steps in FIG. 5.

Figure 6:
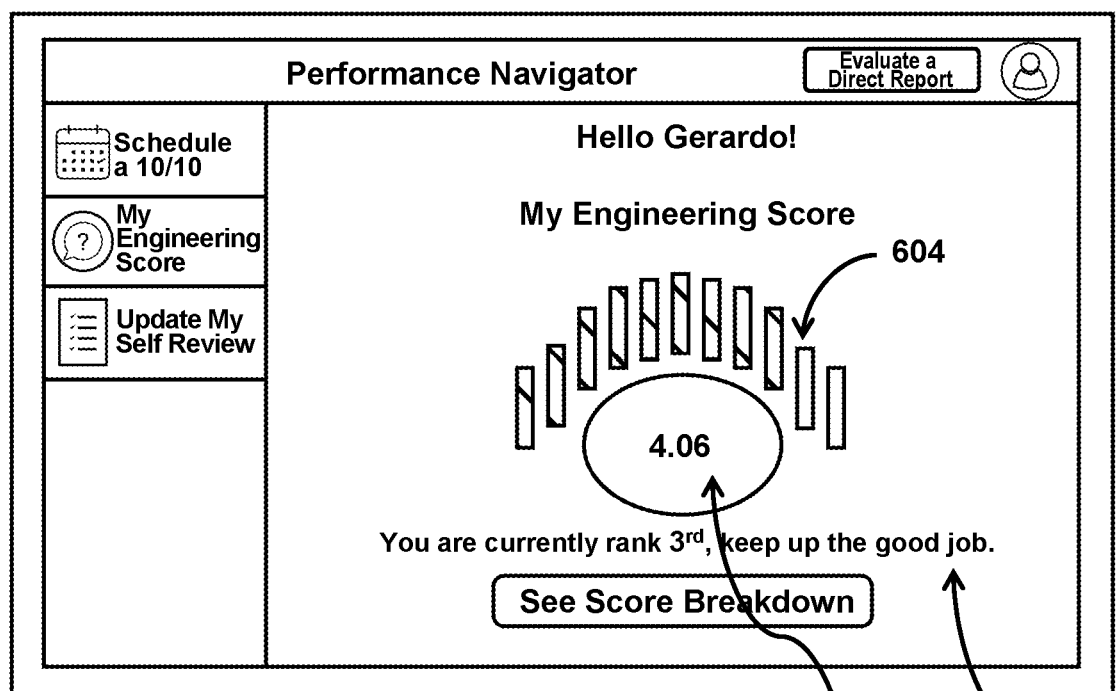
FIG. 6 shows an illustrative user interface displaying a graphical representation of a software development score, in accordance with one or more embodiments.

FIG. 6 shows an illustrative user interface displaying a graphical representation of a software development score, in accordance with one or more embodiments. For example, user interface 600 may be generated for display on user device 222 (FIG. 2) using one or more components of system 200 (FIG. 2).

User interface 600 includes a qualitative software development score. The score is represented in a plurality of manners such as numerical representation 602, graphical representation 604, and textual representation 606. It should be noted that the qualitative software development score may be expressed in any manner that relates to and/or is measured by the quality of the contributor's contributions rather than their quantity.

In some embodiments, the system may provide multiple expressions of the qualitative software development score. The expression selected and/or the arrangement of the expressions may be dynamically selected based on information in a user profile.

Figure 10:
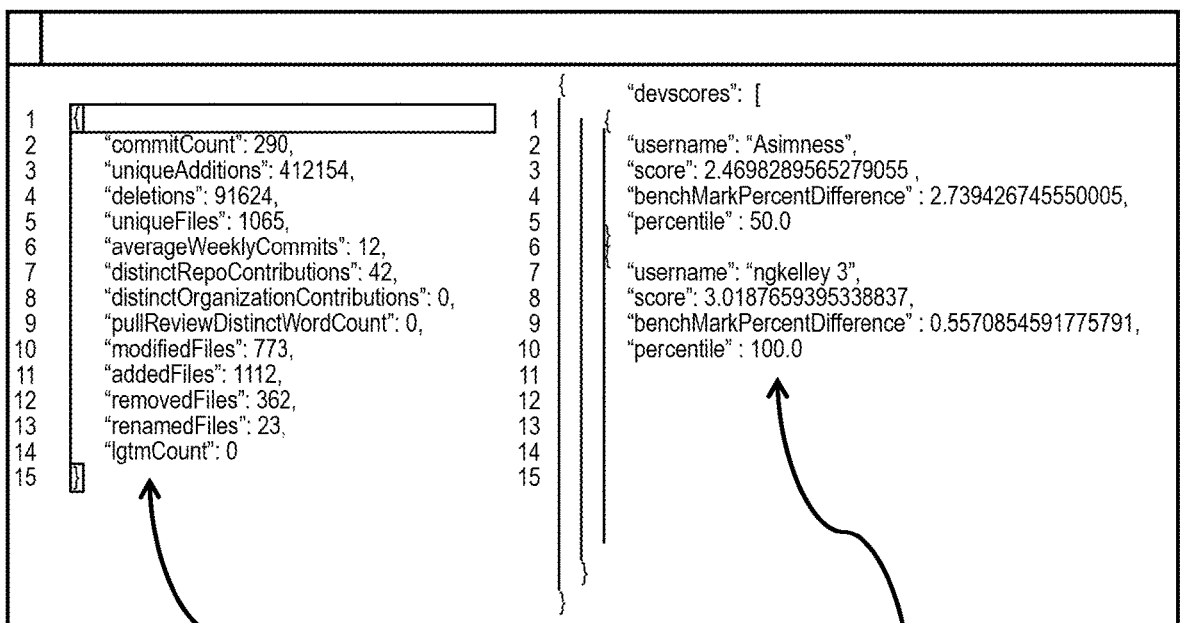
FIG. 10 shows an illustrative pseudocode for generating software development scores, in accordance with one or more embodiments.

For example, a system may receive a first plurality of quantitative software development metrics. For example, the system may receive quantitative software development metrics (e.g., as shown in FIG. 10), which relate to and/or measured by the quantity of the contributor's contributions rather than their quality.

The system may then apply a respective weight to each of the first plurality of quantitative software development metrics to generate the first plurality of weighted metrics. For example, the system may receive a weight specified by a contributor, a project team management, an institution that establishes weights for given metrics. In some embodiments, the system may use a machine learning model (e.g., machine learning model 202 (FIG. 2)) to select weights.

For example, the system may retrieve data on contributors having a known strong performance and the metrics related to those contributors. The system may then apply a machine learning model to select weights for the various metrics such that a score based on the plurality of weighted metrics has the highest likelihood of indicating a strong performance.

After applying the respective weights, the system may then calculate the first software development score based on the first plurality of weighted metrics. In some embodiments, the weighted development score may be based on the algorithm below where "W" corresponds to a weight and "m" corresponds to a given quantitative software development metric.

$$f = 100 * \sum_{j=\square}^{\square} \square \ln(W_1 * \underline{m}_1) + \ln(W_2 * \underline{m}_2) \ldots \ln(W_j * \underline{m}_j)$$

Figure 7:
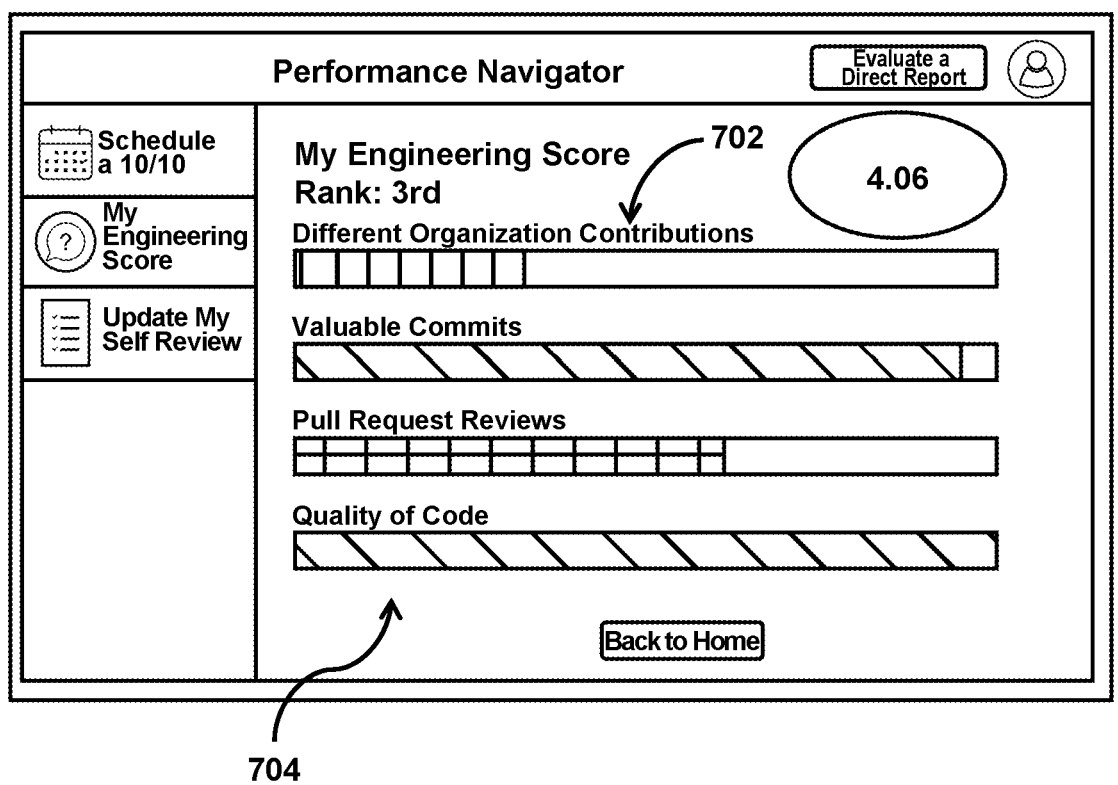
FIG. 7 shows an illustrative user interface displaying a graphical representation of a software development score corresponding to contribution categories, in accordance with one or more embodiments.

FIG. 7 shows an illustrative user interface displaying a graphical representation of a software development score corresponding to contribution categories, in accordance with one or more embodiments. For example, user interface 700 may be generated for display on user device 222 (FIG. 2) using one or more components of system 200 (FIG. 2). For example, in addition to recording quantitative software development metrics for a plurality of contributors and from a plurality of software development tools in order to generate a software development score, the system may also store information about a type of contribution.

For example, the system may store information such as a contribution category. In some embodiments, a contribution category may include the diversity of the contributions, the value on individual contributions, the number of specific actions (e.g., pull requests), and/or assessments of the quality of code. For example, the system may create categories based on any characteristic that may distinguish one category from another.

The system may further categorize a plurality of weighted (or unweighted) metrics prior to creating the qualitative software development score. For example, the system may create different qualitative software development scores for various categories. The system may then generate graphical representations of these scores and display them together (e.g., as shown in FIG. 7).

For example, the system may generate for display a first categorical qualitative software development score (e.g., score 702) along with a second categorical qualitative software development score (e.g., score 704). As described in FIG. 6, the system may provide a variety of audio/visual and/or textual cues to indicate the qualitive nature of each score. For example, as shown in FIG. 7, user interface 700 may include bar graphs, color variations, numerical assessments, and textual descriptions to provide an intuitive user interface.

Figure 8:
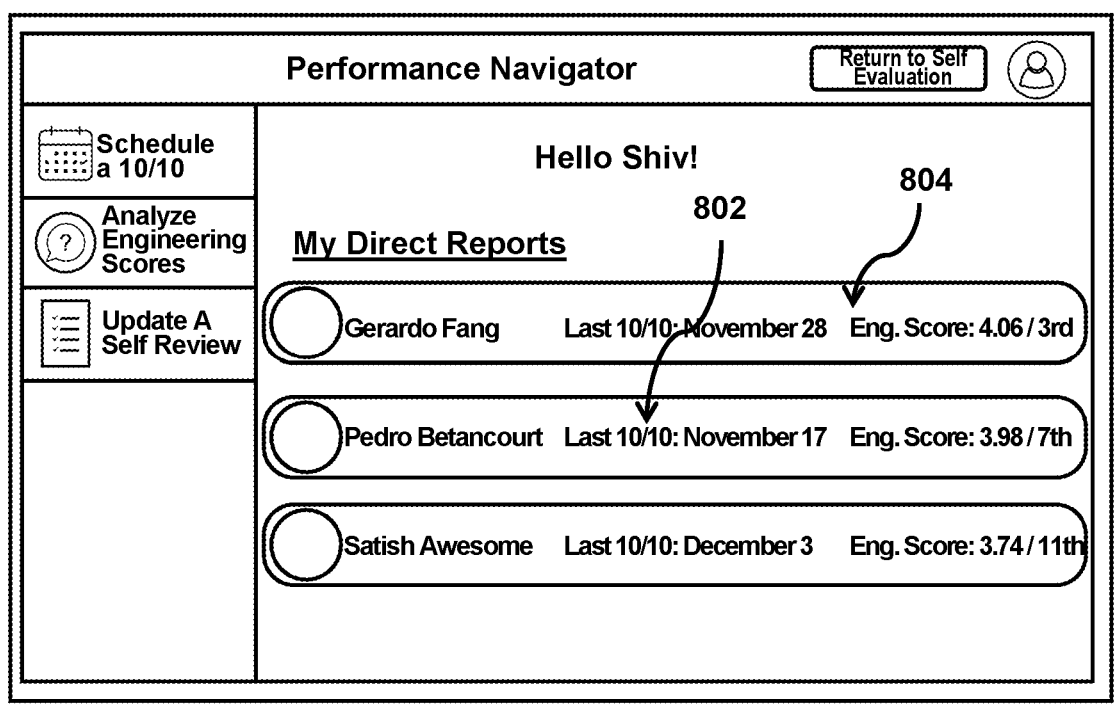
FIG. 8 shows an illustrative user interface displaying graphical representations of a plurality of software development scores for respective users, in accordance with one or more embodiments.

FIG. 8 shows an illustrative user interface displaying graphical representations of a plurality of software development scores for respective users, in accordance with one or more embodiments. For example, user interface 800 may be generated for display on user device 222 (FIG. 2) using one or more components of system 200 (FIG. 2).

For example, in some embodiments, the system may determine that a contributor or project manager may have access to a plurality of other contributors' software development scores as well as additional information. For example, the user profile of the contributor may indicate that the contributor has access to qualitative comparison of a first software development score and other software development scores, individual software development scores for other users, categorical breakdowns of individual software development scores for other users, and/or software development metrics of one or more users.

For example, as shown in user interface 800, the system has generated individual report 802 and individual report 804. The contributor may access these individual reports and view information about the current, historical, and/or future extrapolated software development score projections for a selected contributor. For example, the system may receive a user input, and in response to the user input, generate for display a list of a plurality of quantitative software development metrics and/or scores. These metrics and/or scores may be further selectable to review the identities of individual contributors as well as information about the individual contributors. The information that is accessible may be filtered by the system based on the authorization of the contributor accessing the information and/or the contributor for whom information about is being accessed.

Figure 9:
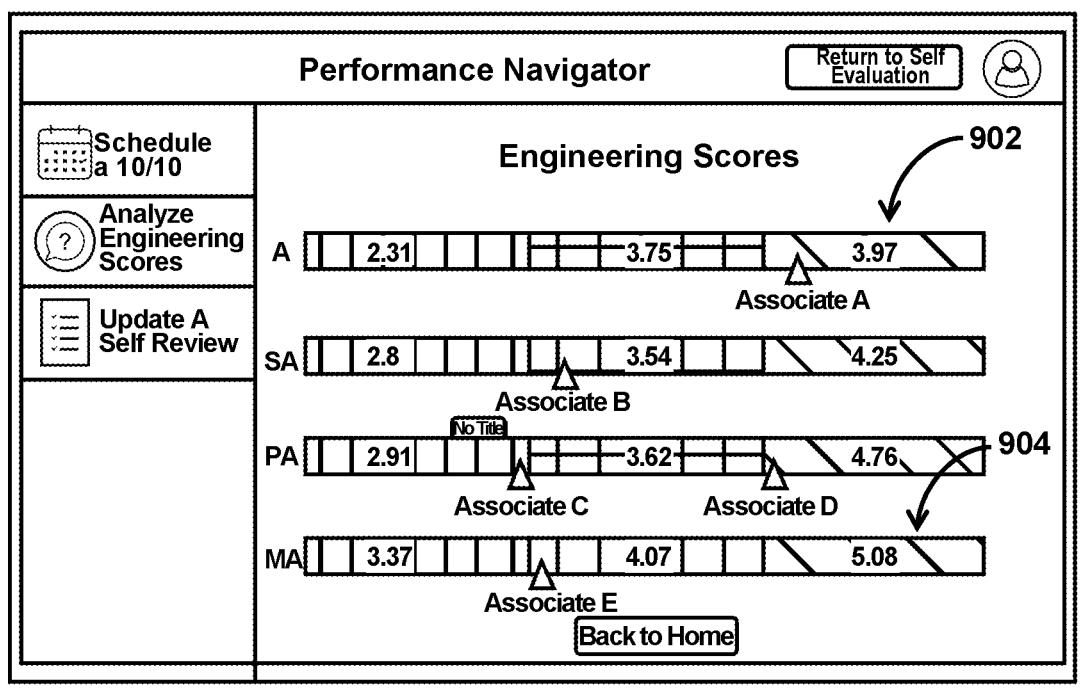
FIG. 9 shows an illustrative user interface displaying graphical representation of a qualitative comparison of a first software development score and other software development scores, in accordance with one or more embodiments.

FIG. 9 shows an illustrative user interface displaying graphical representation of a qualitative comparison of a first software development score and other software development scores, in accordance with one or more embodiments. For example, user interface 900 may be generated for display on user device 222 (FIG. 2) using one or more components of system 200 (FIG. 2).

For example, the system may generate for display, on a local device (e.g., user device 222 (FIG. 2)), a graphical representation of a qualitative comparison of the first software development score and a subset of a plurality of other software development scores. As shown in FIG. 9, the comparison may include information on the title, identity, and/or other categorical breakdown of the contributors. In such a fashion, a contributor may assess his/her performance based on the performance of other contributors in a similar category (e.g., job title, seniority, pay level, etc.). For example, graphic 902 may show a first contributor's performance among other contributors sharing the same job title, whereas graphic 904 may show a second contributor's performance among other contributors sharing the same job title.

For example, the system may determine a contributor category for a contributor and filter a subset of the plurality of other software development scores for software development scores corresponding to contributors in the contributor category. For example, the system may filter the software development scores for contributors having a common seniority and/or job title.

The system may then generate for display a graphical representation of a qualitative comparison of the first software development score and the filtered subset of the plurality of other software development scores. The recommendations may include recommendations for future projects and/or tasks as well as recommendation on a contributor's performance. For example user interface 900 may display a software development score using graphical elements to display whether or not the contributor is performing above or below an average for a given category of contributors.

FIG. 10 shows an illustrative pseudocode for generating software development scores, in accordance with one or more embodiments. For example, user interface 1000 may show exemplary source code for a software development version control system that monitors contributor performance for source code programming projects. For example, user interface 1000 may be generated for display on user device 222 (FIG. 2) using one or more components of system 200 (FIG. 2).

As shown in user interface 1000, the system has generated a plurality of quantitative software development metrics. For example, the system may generate these metrics by analyzing contributions from a first software development tool. The system may then iteratively update the plurality of quantitative software development metrics as issues are detected with the contribution. For example, in response to detecting that a contributor has committed an additional contribution to the system, the system may include the metric corresponding to committed contributions by one.

In some embodiments, the system may monitor numerous metrics. The metrics may include the number, quality, or predetermined value of various metrics. In some embodiments, the system may determine the metrics in real-time and update the metrics accordingly. For example, the system may receive a contribution committed to the software development version control system from a contributor and update the metric of the contributor iteratively. Illustrative metrics may include a number, quality, or predetermined value of contributions, including additions, deletions, removals, renames, and/or modification submitted to the system and/or applied to contributions.

In some embodiments, the system may further generate metrics as a relation to a time period, contribution category, and/or contributor category. For example, the system may track average weekly contributions to the software development version control system. The system may track contributions of a given type as well as be a category of contributors. In some embodiments, the system may further compare contributions to other contributions. For example, the system may determine how unique and/or distinct a given project contributions is. Additionally or alternative, the system may generate one or more statistics for the contribution (e.g., length, average number of issues, etc.).

The system may track these metrics as shown by metrics 1002 in user interface 1000. Furthermore, the system may track the metrics for individual users in order to generate software development scores for individual contributors (e.g., score 1004).

Figure 11:
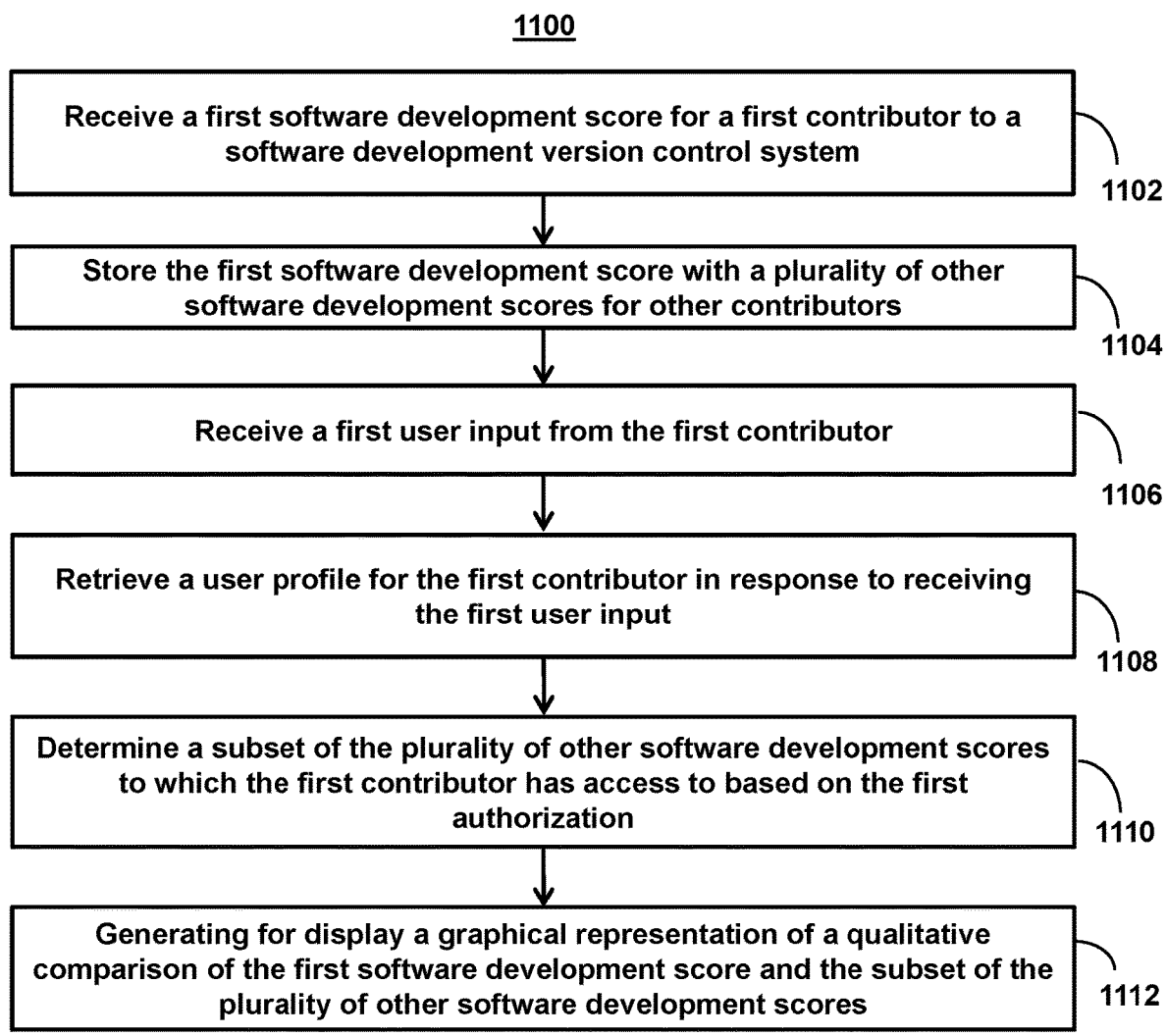
FIG. 11 shows a flowchart of the steps involved in generating for display a graphical representation of a qualitative comparison of a first software development score and a subset of the plurality of other software development scores, in accordance with one or more embodiments.

FIG. 11 shows a flowchart of the steps involved in generating for display a graphical representation of a qualitative comparison of a first software development score and a subset of the plurality of other software development scores, in accordance with one or more embodiments. For example, process 1200 provides one embodiment of how to generate the software development score featuring numerical representation 602 (FIG. 6).

At step 1102, process 1100 receives (e.g., via a software development version control system) a first software development score for a first contributor to a software development version control system. For example, the first software development score may be based on a first plurality of weighted metrics. In some embodiments, the system may receive a first plurality of quantitative software development metrics. The system may then apply a respective weight to each of the first plurality of quantitative software development metrics to generate the first plurality of weighted metrics, and the system may then calculate the first software development score based on the first plurality of weighted metrics.

At step 1104, process 1100 stores (e.g., in database of system 200 (FIG. 2)) the first software development score with a plurality of other software development scores for other contributors. At step 1106, process 1100 receives (e.g., via a software development version control system) a first user input from the first contributor. For example, the first user input may be a user input requesting access to a database with a plurality of software development score and/or a user input requesting access to user interface 600 (FIG. 6)).

At step 1108, process 1100 retrieves (e.g., via a software development version control system) a user profile for the first contributor. For example, the user profile may be stored by the system and have information related to the user. For example, the user profile may include a first authorization in response to receiving the first user input.

At step 1110, process 1100 determines (e.g., via a software development version control system) a subset of the plurality of other software development scores to which the first contributor has access based on the first authorization. For example, in order to preserve privacy of contributors, the system may generate comparisons based on an authorization level of a contributor requesting access. Accordingly, in some embodiments, the system may first determine the plurality of scores (e.g., corresponding to a plurality of other contributors) to which the contributor requesting access is authorized to access.

At step 1112, process 1100 generates for display (e.g., on a local device such as user device 222 (FIG. 2)) a graphical representation of a qualitative comparison of the first software development score and the subset of the plurality of other software development scores (e.g., as shown in FIG. 9). For example, the system may also receive a second software development score for a second contributor to the software development version control system, wherein the second software development score is based on a second plurality of weighted metrics. The system may then determine the first contributor has access to the second software development score based on the first authorization. The system may then generate for display a graphical representation of the second software development score and/or generate for display a graphical representation of a qualitative comparison of the first software development score and the second software development score.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 and 6-10 could be used to perform one or more of the steps in FIG. 11.

Figure 12:
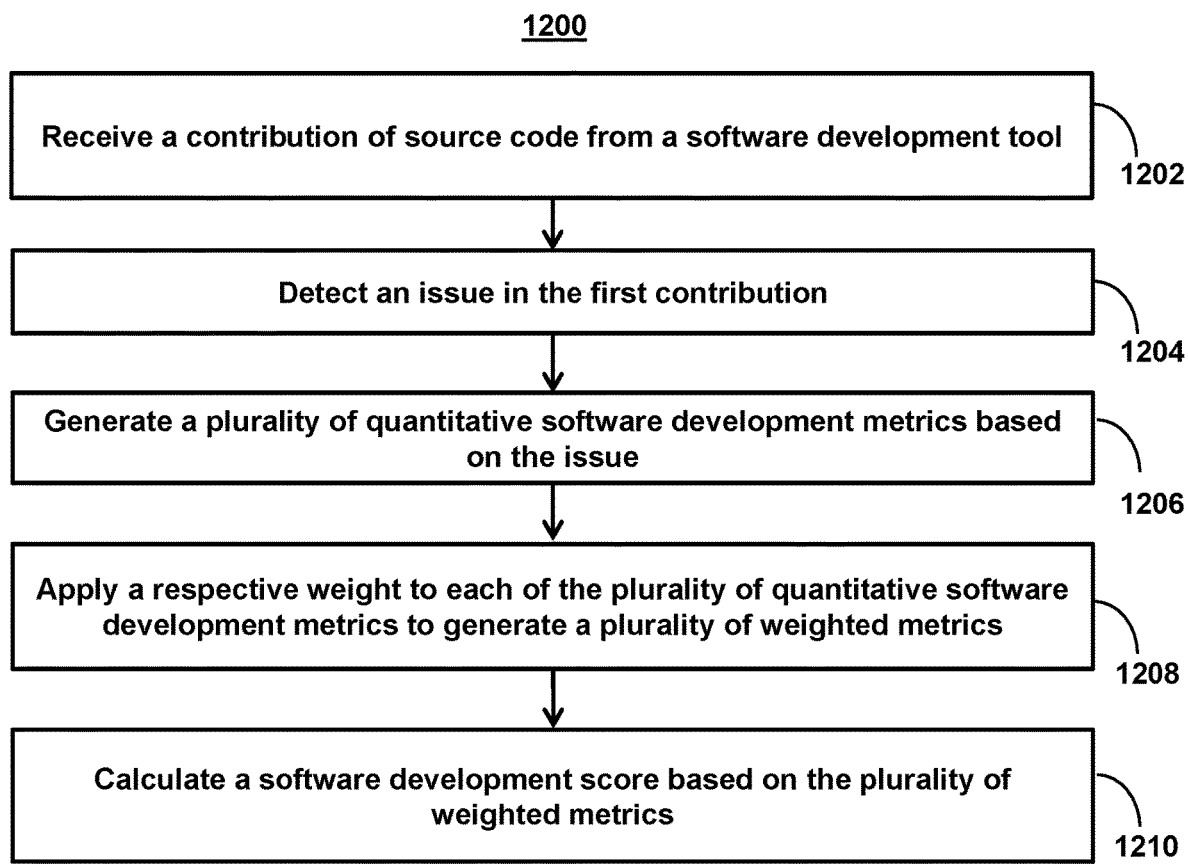
FIG. 12 shows flowchart of the steps involved in calculating a software development score based on a plurality of weighted metrics, in accordance with one or more embodiments.

FIG. 12 shows a flowchart of the steps involved in calculating a software development score based on a plurality of weighted metrics, in accordance with one or more embodiments. For example, process 1200 provides one embodiment of how to generate the software development score featuring numerical representation 602 (FIG. 6).

At step 1202, process 1200 receives (e.g., via a software development version control system) a contribution of source code from a software development tool. For example, the system may receive a contributor submission of a contribution. The software development version control system may store and track these contributions as well as update a project management tool (e.g., as described in FIG. 1).

At step 1204, process 1200 detects (e.g., via a software development version control system) an issue in the first contribution. For example, the system may identify an issue automatically (e.g., based on bug-tracking or automatic issued detection) or manually based on a peer review. The tags may include information (e.g., metadata) describing the identified issue.

At step 1206, process 1200 generates (e.g., via a software development version control system) a plurality of quantitative software development metrics based on the issue. For example, in some embodiments, the software development metrics may include metrics relating to contributions committed to the software development version control system, unique additions to the software development version control system, deletions submitted to the software development version control system, unique contributions added to the software development version control system, average weekly contributions to the software development version control system, distinct project contributions to the software development version control system, distinct organization contributions to the software development version control system, contribution statistics, number of contribution modifications submitted to the software development version control system, number of contributions added to the software development version control system, number of contributions removed from the software development version control system, number of contributions renamed at the software development version control system, or number of positive reviews of contributions. These metrics may be expressed in a quantitative fashion (e.g., a number contributions committed). Alternatively or additionally, the metrics may be expressed in a qualitative fashion (e.g., "above average", "average", "below average", "good", "bad", etc.).

At step 1208, process 1200 applies (e.g., via a software development version control system) a respective weight to each of the plurality of quantitative software development metrics to generate a plurality of weighted metrics. The weight may be a quantitative or qualitative measure of the importance of a given metric. For example, the weight may indicate that the metric is particularly important therefore any issues with the contribution are more heavily weighed against the contributor's resolution metric (and overall performance metric and/or level). Additionally or alternatively, a project manager may manually, or the system may automatically, weight the contribution based on additional factors (e.g., the assigned user is attempting this type of contribution for the first time, the contribution must be performed within a short turnaround time, etc.).

At step 1210, process 1200 calculates (e.g., via a software development version control system) a software development score based on the plurality of weighted metrics. For example, the system may use one or more algorithms featuring one or more of the of development scores. In some embodiments, the system may use a weighted average as described in relation to FIG. 6.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 and 6-10 could be used to perform one or more of the steps in FIG. 12.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of monitoring contributor performance in software development version control systems, the method comprising: receiving a first contribution of source code for a first project to a software development version control system, wherein the first contribution is received from a first contributor; tagging the first contribution with a first identified issue; assigning the first identified issue to a second contributor; receiving a second contribution of source code to resolve the first identified issue; determining a first resolution type of the second contribution; determining a first length of programming time corresponding to the second contribution; generating a first resolution metric for the second contribution based on the first resolution type and the first length of programming time; assigning the first resolution metric to the first contributor; and generating for display a first performance recommendation for the first contributor, wherein the first performance recommendation is based on comparing the first resolution metric to a first plurality of resolution metrics assigned to other contributors of the first project.

2. The method of embodiment 1, wherein the first performance recommendation is further based on determining a first number of contributions of first contributor to the first project without an identified issue.

3. The method of embodiment 1 or 2, wherein generating the first resolution metric further comprises: determining a first contributor level of the first contributor; determining a second contributor level of the second contributor; and determining a difference between the first contributor level and the second contributor level, wherein the first resolution metric is further based on the difference.

4. The method of any one of embodiments 1-3, wherein generating the first resolution metric further comprises: determining a number of contributions to the first project of the first contributor during a first time period; determining an average number of contributions by the other contributors to the first project; and determining a difference between the number of contributions and the average number of contributions, wherein the first resolution metric is further based on the difference.

5. The method of any one of embodiments 1-4, wherein generating the first resolution metric further comprises: determining a first weight for the first contribution, wherein the first weight is assigned by a manager of the first project, wherein the first resolution metric is further based on the first weight.

6. The method of any one of embodiments 1-5, wherein generating the first performance recommendation further comprises comparing the first resolution metric to a second plurality of resolution metrics assigned to other contributors of a second project.

7. The method of any one of embodiments 1-6, wherein the first resolution metric is generated using a machine learning model that compares the first length of programming time to a determined average length of programming time for the first resolution type.

8. The method of any one of embodiments 1-7, further comprising receiving a third contribution for the first project from the first contributor, wherein the third contribution is not a source code contribution, and wherein the first performance recommendation is further based on the third contribution.

9. The method of any one of embodiments 8, wherein the first performance recommendation is further based on: determining a current performance level of the first contributor; determining an average performance level of the other contributors; and comparing the current performance level of the first contributor to the average performance level of the other contributors.

10. The method of any one of embodiments 1-9, wherein assigning the first identified issue to the second contributor comprises: determining a current performance level of the first contributor; determining a current performance level of the second contributor; comparing the current performance level of the first contributor to the current performance level of the second contributor; and assigning the first identified issue to the second contributor in response to determining that the current performance level of the second contributor exceeds the current performance level of the first contributor.

11. A method of monitoring contributor performance in software development version control systems, the method comprising: receiving, using control circuitry, a first software development score for a first contributor to a software development version control system, wherein the first software development score is based on a first plurality of weighted metrics; storing, in a database, the first software development score with a plurality of other software development scores for other contributors; receiving, using the control circuitry, a first user input from the first contributor requesting access to the database; in response to receiving the first user input, retrieving, using the control circuitry, a user profile for the first contributor, wherein the user profile includes a first authorization; determining, using the control circuitry, a subset of the plurality of other software development scores to which the first contributor has access to based on the first authorization; and generating for display, on a local device, a graphical representation of a qualitative comparison of the first software development score and the subset of the plurality of other software development scores.

12. The method of embodiment 11, further comprising: receiving a first plurality of quantitative software development metrics; applying a respective weight to each of the first plurality of quantitative software development metrics to generate the first plurality of weighted metrics; and calculating the first software development score based on the first plurality of weighted metrics.

13. The method of embodiment 12, further comprising: determining a subset of the first plurality of quantitative software development metrics corresponding to a first contribution category; and generating for display a graphical representation of a qualitative assessment of the subset of the first plurality of quantitative software development metrics corresponding to a first contribution category.

14. The method of embodiment 12 or 13, wherein the first plurality of quantitative software development metrics include metrics relating to contributions committed to the software development version control system, unique additions to the software development version control system, deletions submitted to the software development version control system, unique contributions added to the software development version control system, average weekly contributions to the software development version control system, distinct project contributions to the software development version control system, distinct organization contributions to the software development version control system, contribution statistics, number of contribution modifications submitted to the software development version control system, number of contributions added to the software development version control system, number of contributions removed from the software development version control system, number of contributions renamed at the software development version control system, or number of positive reviews of contributions.

15. The method of anyone of embodiments 12-14, further comprising: receiving a first contribution of source code from a first software development tool; detecting an issue in the first contribution; and generating the first plurality of quantitative software development metrics based on the issue.

16. The method of anyone of embodiments 11-15, further comprising: receiving a second software development score for a second contributor to the software development version control system, wherein the second software development score is based on a second plurality of weighted metrics; determining the first contributor has access to the second software development score based on the first authorization; and generating for display a graphical representation of the second software development score.

17. The method of anyone of embodiments 11-16, further comprising: receiving a second user input; in response to the second user input, generating for display a list of the first plurality of quantitative software development metrics.

18. The method of anyone of embodiments 11-17, further comprising: determining a contributor category for the first contributor; filtering the subset of the plurality of other software development scores for software development scores correspond to contributors in the contributor category; and generating for display a graphical representation of a qualitative comparison of the first software development score and the filtered subset of the plurality of other software development scores.

19. The method of anyone of embodiments 11-18, further comprising: receiving an updated first software development score for the first contributor; storing, in the database, the updated first software development score; and generating for display a graphical representation of a relationship of the first software development score to the updated first software development score.

20. The method of embodiment 19, further comprising: extrapolating a future first software development score for the first contributor on a future project based on the first software development score and the updated first software development score; and generating for display a recommendation for staffing the future project based on the future first software development score.

21. A tangible, non-transitory, machine-readable medium storing instructions that, when executed by a data processing apparatus, cause the data processing apparatus to perform operations comprising those of any of embodiments 1-20.

22. A system comprising: one or more processors; and memory storing instructions that, when executed by the processors, cause the processors to effectuate operations comprising those of any of embodiments 1-20.

23. A system comprising means for performing any of embodiments 1-20.

What is claimed is:

1. A software development version control system for monitoring contributor performance for source code programming projects, comprising:
   cloud-based memory configured to store current source code for a first project and tags for identified issues in the current source code; and
   cloud-based control circuitry configured to:
      receive a first contribution of source code for a first project to a software development version control system, wherein the first contribution is received from a first contributor;
      tag the first contribution with a first identified issue;
      assign the first identified issue to a second contributor;
      receive a second contribution of source code to resolve the first identified issue;
      determine a first length of programming time corresponding to the second contribution;
      generate a first resolution metric for the second contribution based on the first length of programming time, wherein the first resolution metric is generated using a machine learning model that compares the first length of programming time to a determined average length of programming time;
      assign the first resolution metric to the first contributor; and
   cloud-based I/O circuitry configured to generate for display, on a local display device, a first performance recommendation for the first contributor, wherein the first performance recommendation is based on comparing the first resolution metric to a first plurality of resolution metrics assigned to other contributors of the first project.

2. A method of monitoring contributor performance in software development version control systems, the method comprising:
receiving a first contribution of source code for a first project to a software development version control system, wherein the first contribution is received from a first contributor;
tagging, at the software development version control system, the first contribution with a first identified issue;
assigning, at the software development version control system, the first identified issue to a second contributor;
receiving, at the software development version control system, a second contribution of source code to resolve the first identified issue;
determining, at the software development version control system, a first length of programming time corresponding to the second contribution;
generating, at the software development version control system, a first resolution metric for the second contribution based on the first length of programming time; and
generating for display, on a display device, a first performance recommendation for the first contributor, wherein the first performance recommendation is based on comparing the first resolution metric to a first plurality of resolution metrics assigned to other contributors of the first project.

3. The method of claim 2, wherein the first performance recommendation is further based on determining a first number of contributions of first contributor to the first project without an identified issue.

4. The method of claim 2, wherein generating the first resolution metric further comprises:
determining a first contributor level of the first contributor;
determining a second contributor level of the second contributor; and
determining a difference between the first contributor level and the second contributor level, wherein the first resolution metric is further based on the difference.

5. The method of claim 2, wherein generating the first resolution metric further comprises:
determining a number of contributions to the first project of the first contributor during a first time period;
determining an average number of contributions by the other contributors to the first project; and
determining a difference between the number of contributions and the average number of contributions, wherein the first resolution metric is further based on the difference.

6. The method of claim 2, wherein generating the first resolution metric further comprises:
determining a first weight for the first contribution, wherein the first weight is assigned by a manager of the first project, wherein the first resolution metric is further based on the first weight.

7. The method of claim 2, wherein generating the first performance recommendation further comprises comparing the first resolution metric to a second plurality of resolution metrics assigned to other contributors of a second project.

8. The method of claim 2, wherein the first resolution metric is generated using a machine learning model that compares the first length of programming time to a determined average length of programming time.

9. The method of claim 2, further comprising receiving a third contribution for the first project from the first contributor, wherein the third contribution is not a source code contribution, and wherein the first performance recommendation is further based on the third contribution.

10. The method of claim 2, wherein the first performance recommendation is further based on:
determining a current performance level of the first contributor;
determining an average performance level of the other contributors; and
comparing the current performance level of the first contributor to the average performance level of the other contributors.

11. The method of claim 2, wherein assigning the first identified issue to the second contributor comprises:
determining a current performance level of the first contributor;
determining a current performance level of the second contributor;
comparing the current performance level of the first contributor to the current performance level of the second contributor; and
assigning the first identified issue to the second contributor in response to determining that the current performance level of the second contributor exceeds the current performance level of the first contributor.

12. A non-transitory computer-readable medium comprising instructions that, when executed by one or more processors, cause operations comprising:
receiving a first contribution of source code for a first project to a software development version control system, wherein the first contribution is received from a first contributor;
tagging, at the software development version control system, the first contribution with a first identified issue;
assigning, at the software development version control system, the first identified issue to a second contributor;
receiving, at the software development version control system, a second contribution of source code to resolve the first identified issue;
determining, at the software development version control system, a first length of programming time corresponding to the second contribution;
generating, at the software development version control system, a first resolution metric for the second contribution based on the first length of programming time; and
generating for display, on a display device, a first performance recommendation for the first contributor, wherein the first performance recommendation is based on comparing the first resolution metric to a first plurality of resolution metrics assigned to other contributors of the first project.

13. The non-transitory computer-readable medium of claim 12, wherein the first performance recommendation is further based on determining a first number of contributions of first contributor to the first project without an identified issue.

14. The non-transitory computer-readable medium of claim 12, wherein generating the first resolution metric further comprises:
determining a first contributor level of the first contributor;

determining a second contributor level of the second contributor; and determining a difference between the first contributor level and the second contributor level, wherein the first resolution metric is further based on the difference.

15. The non-transitory computer-readable medium of claim 12, wherein generating the first resolution metric further comprises:

determining a number of contributions to the first project of the first contributor during a first time period;

determining an average number of contributions by the other contributors to the first project; and determining a difference between the number of contributions and the average number of contributions, wherein the first resolution metric is further based on the difference.

16. The non-transitory computer-readable medium of claim 12, wherein generating the first resolution metric further comprises determining a first weight for the first contribution, wherein the first weight is assigned by a manager of the first project, wherein the first resolution metric is further based on the first weight.

17. The non-transitory computer-readable medium of claim 12, wherein the first resolution metric is generated using a machine learning model that compares the first length of programming time to a determined average length of programming time.

18. The non-transitory computer-readable medium of claim 12, further comprising instructions that, when executed by the one or more processors, cause operations comprising receiving a third contribution for the first project from the first contributor, and wherein the third contribution is not a source code contribution, wherein the first performance recommendation is further based on the third contribution.

19. The non-transitory computer-readable medium of claim 12, wherein the first performance recommendation is further based on:

determining a current performance level of the first contributor;

determining an average performance level of the other contributors; and comparing the current performance level of the first contributor to the average performance level of the other contributors.

20. The non-transitory computer-readable medium of claim 12, wherein assigning the first identified issue to the second contributor comprises:

determining a current performance level of the first contributor;

determining a current performance level of the second contributor;

comparing the current performance level of the first contributor to the current performance level of the second contributor; and assigning the first identified issue to the second contributor in response to determining that the current performance level of the second contributor exceeds the current performance level of the first contributor.

* * * * *